United States Patent [19]

Kakui et al.

[11] Patent Number: 5,835,259
[45] Date of Patent: Nov. 10, 1998

[54] OPTICAL FIBER AMPLIFIER

[75] Inventors: Motoki Kakui; Masayuki Shigematsu, both of Yokohama, Japan

[73] Assignee: Sumitomo Electric Industries, Ltd., Osaka, Japan

[21] Appl. No.: 709,509

[22] Filed: Sep. 6, 1996

[30] Foreign Application Priority Data

Sep. 8, 1995 [JP] Japan .................................. 7-231363

[51] Int. Cl.$^6$ ........................ H04B 10/00; H04B 10/17; H01S 3/06
[52] U.S. Cl. ........................ 359/341; 359/134; 359/337; 359/345
[58] Field of Search ................................ 359/133, 134, 359/160, 174, 337, 341, 345

[56] References Cited

U.S. PATENT DOCUMENTS

| | | | |
|---|---|---|---|
| 5,253,104 | 10/1993 | Delavauex | 359/341 |
| 5,406,404 | 4/1995 | DiGiovanni et al. | 359/179 |
| 5,436,760 | 7/1995 | Wahabayashi | 359/341 |
| 5,530,584 | 6/1996 | Myslinski et al. | 359/341 |
| 5,636,054 | 6/1997 | Artigano et al. | 359/341 |

OTHER PUBLICATIONS

Hilsson et al, Electronics Letters, vol. 31, #18, pp. 1578–1579, Aug. 31, 1995: abst. only herewith.
Kasliwood et al, OFC 95, vol. 8, pp. 77–78, Mar. 3, 1995.
Sugaya et al, OAA'95, FC3, Jun. 16, 1995, 4 pp, Pavos, Switzerland.
Giles et al, IEEE Photoreis Tech. Lett., v–2, #12, Dec. 1990, pp. 866–868; abstract only herewith.
TUH, Wavelength–Division Multiplexing:2, John C. Cartledge, OFC '95 Technical Digest 2 pages.
OFC '95 Technical Digest, A.H. Gnauck et al, 3 pages.

*Primary Examiner*—Nelson Moskowitz
*Attorney, Agent, or Firm*—Pillsbury Madison & Sutro LLP

[57] ABSTRACT

An amplifying optical fiber (111) whose wavelength dependency of gain is approximated by a second-order function of wavelength in which the coefficient of square term of wavelength is a negative value and an amplifying optical fiber (112) whose wavelength dependency of gain is approximated by a second-order function of wavelength in which the coefficient of square term of wavelength is a positive value are cascaded to each other. The amplifying optical fiber (112) is realized as the kind and amount of co-dopant element are appropriately selected. To these amplifying optical fibers, pumping light is supplied by way of fiber type couplers (123, 132) after the light intensities of the pumping light output from pumping light sources (121, 131) are adjusted by light intensity adjusting devices (122, 132). Input signal light is output after being transmitted through an optical isolator (140), the fiber type coupler (123), the amplifying optical fibers (111, 112), the fiber type coupler (133), and an optical isolator (150) under their respective gain characteristics or transmission characteristics. The overall gain of an optical fiber amplifier (100) combining the individual characteristics of these parts together has substantially a linear characteristic with respect to wavelength.

12 Claims, 9 Drawing Sheets

OPTICAL FIBER AMPLIFIER

BACKGROUND OF THE INVENTION

1. Field of the Invention

The present invention relates to an optical fiber amplifier which is used in a repeater of a wavelength division multiplexing (WDM) type optical communication system and collectively amplifies a plurality of signal light components having different wavelengths.

2. Related Background Art

In general, the conventional optical fiber amplifiers used in WDM systems have a greater gain with respect to signal light with a longer wavelength. Accordingly, when multiwavelength signal light is input into an amplifying optical fiber and amplified therein, deviation in gain occurs between individual wavelengths in the multiwavelength signal. In the optical communication system in which a number of repeaters each equipped with such an optical fiber amplifier are cascaded together, the deviation in gain enlarges upon each relaying operation, thus becoming problematic.

In order to overcome this problem, it has been proposed to cascade an amplifying optical fiber such as that mentioned above to an amplifying optical fiber which has such a gain characteristic that its gain becomes smaller as the signal light has a longer wavelength, so as to form an optical fiber amplifier having, as a whole, a low dependency of gain upon wavelength (e.g., T. Kashiwada, et al., OFC'95, TuP1).

On the other hand, in order to supply pumping light to amplifying optical fibers of optical fiber amplifiers, a WDM coupler is used. The WDM coupler includes some types, which are typically represented by fiber type and filter type. The fiber type coupler, which is manufactured as a plurality of optical fibers are brought into close contact with each other in parallel and then extended as being fused together, outputs the pumping light to the amplifying optical fiber by utilizing its characteristic that light incident on one optical fiber is emitted out of another optical fiber. This fiber type coupler, however, has a wavelength dependency such that its transmittance is maximized near the center of the wavelength range of multiwavelength signal light, thereby increasing the deviation in gain of the optical fiber amplifier for wavelength.

By contrast, the filter type coupler, which does not have such a problem, has been used in general. When an optical fiber amplifier using the filter type coupler is employed to perform a plurality of relaying operations, however, the intensity of amplified spontaneous emission (ASE) light or light derived from the ASE light often increases in a wavelength region different from that of the signal light. As a result, the energy of pumping light is consumed for amplifying the increasing ASE light, thereby deteriorating amplifying characteristics, for example, such that the gain in signal light is lowered and the noise figure (NF) is increased. In order to prevent such deterioration, it has been proposed to insert, into a light transmission path, a filter which selectively eliminates only wavelengths near the peak wavelength of the ASE light (e.g., K. Oda, et al., OFC'95, TuH1).

SUMMARY OF THE INVENTION

It is an object of the present invention to provide an optical fiber amplifier having a gain characteristic which is substantially in a linear relationship to wavelength throughout the wavelength range of multiwavelength signal light.

The optical fiber amplifier in accordance with the present invention is an optical fiber amplifier which receives signal light having a wavelength included in a wavelength range from a first wavelength as a lower limit wavelength to a second wavelength as an upper limit wavelength, amplifies this signal light, and then outputs thus amplified signal light. This optical fiber amplifier comprises (a) a pumping means for generating pumping light; (b) a first amplifying optical fiber which, in a state where the pumping light output from the pumping means is input therein, receives light in the wavelength range, amplifies thus received light, and then outputs thus amplified light, while its wavelength dependency of gain in the wavelength range has a correlation ratio of not smaller than 0.99 with respect to a first second-order regression curve expressed by a first second-order function in which the wavelength is an independent variable and the coefficient of square term of the wavelength is a negative value; and (c) a second amplifying optical fiber which is optically cascaded to the first amplifying optical fiber and, in a state where the pumping light output from the pumping means is input therein, receives light in the wavelength range, amplifies thus received light, and then outputs thus amplified light, while its wavelength dependency of gain in the wavelength range has a correlation ratio of not smaller than 0.99 with respect to a second second-order regression curve expressed by a second second-order function in which the wavelength is an independent variable and the coefficient of square term of the wavelength is a positive value. The overall transmission characteristic of a plurality of optical parts, except for the first amplifying optical fiber and the second amplifying optical fiber, through which the signal light passes is substantially expressed by a third function which is of second order or lower, while a fourth function which is the sum of the first and second second-order functions and the third function is substantially a linear function.

Here, the linear function refers to a first-order function or a zero-order function.

Preferably, the pumping means comprises a light intensity adjusting means for adjusting the light intensities of pumping light respectively supplied to the first and second amplifying optical fibers. In this case, the first and second amplifying optical fibers can be supplied with their respective light intensities of pumping lights which are determined according to the lengths of the first and second amplifying optical fibers, their wavelength dependency characteristics of amplification factor per unit length of the first and second amplifying optical fibers, and the third function.

The pumping means may comprise (i) a first fiber type coupler which receives the pumping light from a first terminal and outputs thus received pumping light from a second terminal toward the first amplifying optical fiber, while transmitting the signal light therethrough between the second terminal and a third terminal and (ii) a second fiber type coupler which receives the pumping light from a first terminal and outputs thus received pumping light from a second terminal toward the second amplifying optical fiber, while transmitting the signal light therethrough between the second terminal and a third terminal. Also in this case, as the gain characteristic of the first amplifying optical fiber and that of the second amplifying optical fiber are selectively used, the second-order component of wavelength in the transmission characteristic of the fiber type coupler can be canceled, whereby substantially a linear overall gain characteristic can be attained in the optical fiber amplifier.

While an Er-doped optical fiber co-doped with Al can be selected as the first amplifying optical fiber, (i) an Er-doped optical fiber co-doped with P or (ii) an Er-doped optical fiber co-doped with P and Al can be selected as the second amplifying optical fiber.

When P and Al are added to the second amplifying optical fiber, Al preferably has a concentration of 1 wt % or lower.

In accordance with the present invention, the first amplifying optical fiber in which the wavelength dependency of gain has an upward protruded form throughout the signal light wavelength range and the second amplifying optical fiber in which the wavelength dependency of gain has a downward protruded form throughout the signal light wavelength range are cascaded to each other, and pumping light is supplied thereto by way of an optical coupler, such that the overall gain based on the gain characteristics of the first and second amplifying optical fibers and the signal light transmission characteristics of the optical coupler and the like substantially has a linear characteristic with respect to wavelength in the signal light wavelength range. As a result, the dependency of the overall gain of the optical fiber amplifier with respect to wavelength becomes linear or constant. Even in the case where the wavelength dependency of gain is not constant but linear, gain can be easily made constant with respect to wavelength when a passive selective filter is further provided therewith.

Also, when the lengths of the first and second amplifying optical fibers are set to their predetermined values, and the light intensities of pumping lights supplied to the first and second amplifying optical fibers are adjusted by the light intensity adjusting means, the wavelength dependency of the optical fiber amplifier can be adjusted, whereby substantially a linear gain characteristic can be obtained.

Also, even when a fiber type coupler having an inconstant wavelength characteristic is used as an optical coupler for supplying pumping light to the first and second amplifying optical fibers, the gain characteristic forms of the first and second amplifying optical fibers may be adjusted to attain a flat overall gain characteristic in the optical fiber amplifier. Here, when a fiber type coupler is used, it is unnecessary to use the ASE light eliminating filter. Accordingly, the loss in signal light caused by insertion of the ASE light eliminating filter and the cost incurred by increase in the number of parts can be lowered, whereby system reliability can be improved.

Also, the second amplifying optical fiber having the gain characteristic explained above can be realized by an Er-doped optical fiber co-doped with P element. When it is further doped with an appropriate amount of Al element, the gain characteristic can be adjusted.

Further, when each amplifying optical fiber is elongated, the overall gain of the optical fiber amplifier can be made large. In this case, the number of relaying operations can be reduced, whereby the system reliability can also be improved.

In the foregoing manner, an optical fiber amplifier which has a gain characteristic free of wavelength dependency and prevents generation of ASE light can be implemented. Accordingly, even when multiwavelength signal light is repeatedly amplified as a whole by the optical fiber amplifier in an optical communication system of WDM type with a number of relaying operations, there is no wavelength dependency of gain in the optical communication system as a whole, whereby gain of the signal light received on the receiving side can be made constant regardless of wavelength.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, embodiments of the present invention will be explained in detail with reference to the drawings. Here, in the explanation of the drawings, constituents identical to each other will be referred to with marks identical to each other, without their overlapping explanations being repeated.

First, prior to the explanation of the embodiments, amplifying optical fibers and their general gain characteristics will be explained. An amplifying optical fiber receives signal light and pumping light, amplifies the signal light, and then outputs thus amplified signal light. When the signal light input therein has a plurality of wavelengths, they are collectively amplified. In order to attain such a signal light amplifying effect, these amplifying optical fibers are doped with a rare-earth element. In particular, an Er-doped fiber (EDF: Erbium-Doped Fiber) containing Er element as the dopant rare-earth element is preferably used. In the case of an optical fiber amplifier using this Er-doped optical fiber (EDFA: Erbium-Doped Fiber Amplifier), for example, Er element is excited with pumping light having a wavelength of 1.48 $\mu$m, whereby signal light near a wavelength of 1.55 $\mu$m can be efficiently amplified therein.

Typically, the gain characteristic of an amplifying optical fiber is such that gain is greater as the signal light has a longer wavelength, that gain at any wavelength included in the wavelength range is greater than the value obtained by linear interpolation calculation from the gains at wavelengths of both ends of the wavelength range (this form being referred to as "upward protruded" hereinafter), and that this gain characteristic form does not have a point of inflection (i.e., there is an upward protruded form in any partial wavelength range). Also, the wavelength dependency of gain in an amplifying optical fiber changes depending on the amount of Er element doped, the amount of other elements (e.g., Al element and P element) doped, and the like.

Figure 1:
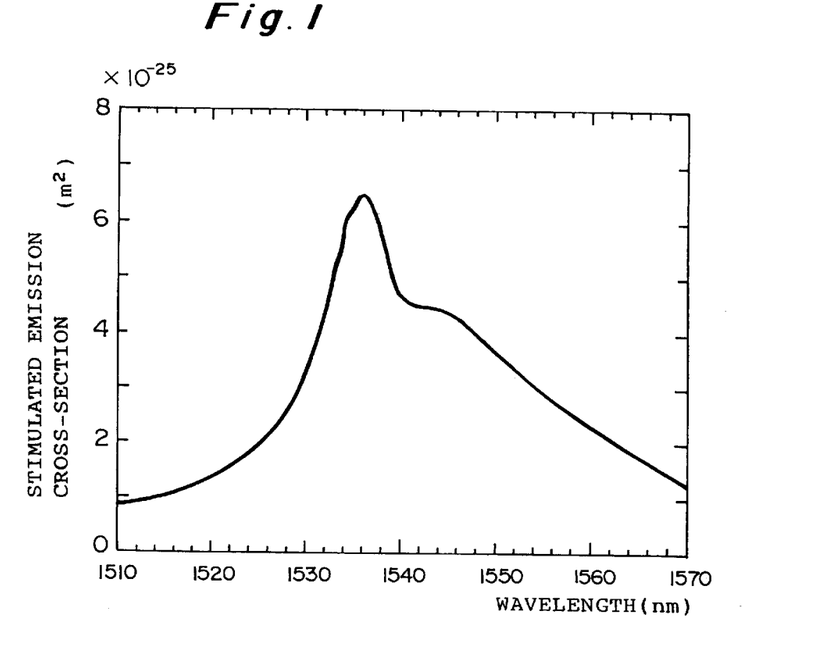
FIGS. 1 and 2 are graphs showing wavelength dependency characteristics of stimulated emission cross-section in Er-doped fibers co-doped with Al element and P element.
Figure 2:
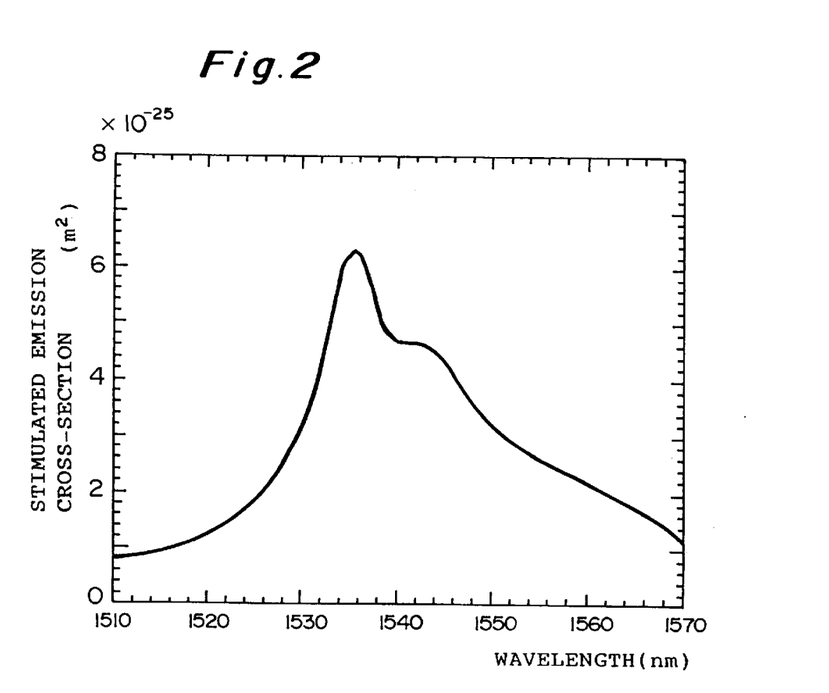

FIGS. 1 and 2 are graphs showing wavelength dependency characteristics of stimulated emission cross-section (gain per unit Er concentration) in Er-doped fibers. FIG. 1 shows the characteristic where the concentrations of P element and Al element are 5 wt % and 2 wt %, respectively; whereas FIG. 2 shows the characteristic where the concentrations of P element and Al element are 5 wt % and 0.8 wt %, respectively. It can be seen that the wavelength dependency of the stimulated emission cross-section near the signal light wavelength range from 1,545 nm to 1,560 nm differs between these graphs. Namely, while the wavelength dependency is substantially linear in FIG. 1; the gain at any wavelength included in this wavelength range in FIG. 2 is smaller than the value obtained by linear interpolation calculation from the gains at wavelengths of both ends of the wavelength range (this form being referred to as "downward protruded" hereinafter), and this gain characteristic form does not have a point of inflection (i.e., there is a downward protruded form in any partial wavelength range). Thus, even in the case where the Er-doped optical fibers have the same dopant concentration of P element, their wavelength dependency characteristics of gain differ from each other when their co-dopant amounts of Al element differ from each other. Namely, the wavelength dependency of gain deviates further from a linear relationship as the co-dopant amount of Al element is smaller, thereby making the downward protruded form more remarkable.

Further, while gain increases as the amplifying optical fiber is longer, the degree of increase is not constant among signal light wavelengths, thereby forming large differences among individual wavelengths of the signal light. Also, while gain increases as the light intensity of pumping light is greater, the degree of increase is not constant among signal light wavelengths but greater with respect to signal light with a shorter wavelength.

The present invention is based on the foregoing finding.

Figure 3:
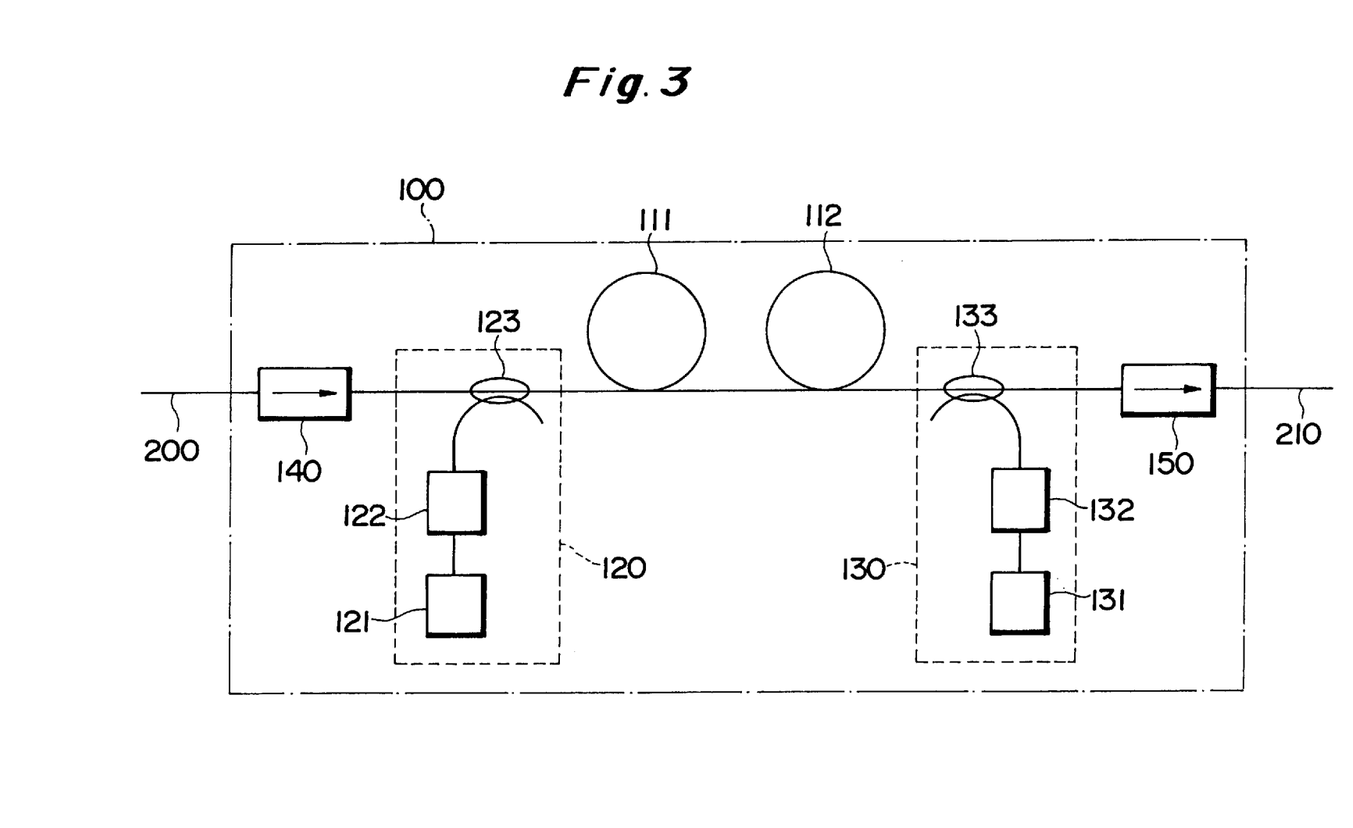
FIG. 3 is a configurational view of an optical fiber amplifier in accordance with a first embodiment of the present invention.

In the following, a first embodiment will be explained. FIG. 3 is a configurational view of the optical fiber amplifier in accordance with this embodiment.

An optical fiber amplifier 100 of this embodiment comprises amplifying optical fibers 111 and 112 cascaded to each other, exciting devices 120 and 130 for supplying light to these amplifying optical fibers 111 and 112, and optical isolators 140 and 150 for transmitting light therethrough only in one direction. When signal light having an arbitrary wavelength λ included in a wavelength range from λ1 to λ2 is transmitted through a transmission optical fiber 200 and reaches the optical fiber amplifier 100, the latter amplifies this signal light and sends it to a transmission optical fiber 210.

Both of the amplifying optical fibers 111 and 112 which receive the pumping light and signal light and amplify the signal light are Er-doped optical fibers, and their dopant amount of Er element is about 1,000 wt·ppm, for example.

The amplifying optical fibers 111 and 112 are individually co-doped with elements other than Er element (e.g., Al element and P element) so as to attain their predetermined gain characteristics, while their individual lengths are defined in view of their dopant amounts as well as the light intensities of pumping lights supplied thereto.

The pumping lights are supplied to the amplifying optical fibers 111 and 112 by the exciting devices 120 and 130, and excites Er element within the amplifying optical fibers 111 and 112 by bidirectional excitation technique. Namely, pumping light output from an pumping light source 121 is appropriately adjusted in terms of light intensity by a light intensity adjusting device 122 and then, by way of a fiber type coupler 123, guided to the amplifying optical fiber 111 and further to the amplifying optical fiber 112. On the other hand, pumping light output from a pumping light source 131 is appropriately adjusted in terms of light intensity by a light intensity adjusting device 132 and then, by way of a fiber type coupler 133, guided to the amplifying optical fiber 112 and further to the amplifying optical fiber 111. Here, in the case where each of the pumping light sources 121 and 131 has a light intensity adjusting function, the light intensity adjusting devices 122 and 132 are unnecessary. For example, as the pumping light sources 121 and 131, a semiconductor laser which outputs pumping light having a wavelength of 1.48 μm can be used. In this case, since the pumping light output can be increased and decreased according to the amount of current supplied to the semiconductor laser, the light intensity adjusting devices 122 and 132 are unnecessary.

Here, in each of the fiber type couplers 123 and 133, the signal light transmittance in the signal light wavelength range does not have a constant wavelength dependency in general. Its signal light transmission characteristic T(λ) is represented by the following relational expression:

$$T(\lambda) = \frac{1}{2} - \left[ 1 + \cos\left( \pi - \frac{\lambda - \lambda_s}{\lambda_s - \lambda_p} \right) \right] \quad (1)$$

wherein $\lambda_s$ is a predetermined wavelength in the signal light wavelength range, $\lambda_p$ is the wavelength of the pumping light, λ is a wavelength in the signal light wavelength range, and π is the ratio of the circumference of a circle to its diameter. For example, when light in a band of 1.55 μm is used as the signal light, $\lambda_s$=1.55 μm and $\lambda_p$=1.48 μm. In this case, T(λ) can be substantially regarded as a second-order function of λ.

Each of the optical isolators 140 and 150 transmits therethrough the signal light, which has reached there by way of the transmission optical fiber 200, only toward the transmission optical fiber 210 and not in the opposite direction. Here, the transmission characteristics of the isolators 140 and 150 with respect to signal light do not depend on the wavelength thereof.

Accordingly, in this embodiment, in the case where the wavelength of its signal light resides in the band of 1.55 μm, the overall transmission characteristic of the optical parts through which the signal light passes, except for the amplifying optical fibers 111 and 112, can be treated as a second-order function of wavelength.

Here, it is important to note that the respective gain characteristics of the amplifying optical fibers 111 and 112 are determined by their dopant element concentrations, their lengths, and the light intensities of pumping lights supplied thereto, and that the wavelength dependency of gain in the optical fiber amplifier 100 is determined by the product of the respective gain characteristics of the amplifying optical fibers 111 and 112, respective transmission characteristics of the fiber type couplers 123 and 133 with respect to signal light, and respective transmission characteristics of the optical isolators 140 and 150 with respect to signal light. Further, it is important to note that the wavelength dependency of gain in the optical fiber amplifier 100 is linear. Here, the light intensity adjusting devices 122 and 132 adjust the pumping lights supplied to the amplifying optical fibers 111 and 112, such that the wavelength dependency of gain in the optical fiber amplifier 100 attains a predetermined linear relationship.

The optical fiber amplifier 100 operates as explained in the following. The multiwavelength signal light which has reached the optical fiber amplifier 100 after being transmitted through the transmission optical fiber 200 passes through the optical isolator 140 and the fiber type coupler 123 so as to be transmitted through the amplifying optical fiber 111 and then through the amplifying optical fiber 112. Here, when the pumping light is supplied to the amplifying optical fibers 111 and 112 from the exciting devices 120 and 130, a plurality of wavelengths of the signal light are collectively amplified while being transmitted through the amplifying optical fibers 111 and 112. Thus amplified signal light passes through the fiber type coupler 133 and the optical isolator 150 so as to be output from the optical fiber amplifier 100 and sent to the transmission optical fiber 210. Upon amplification of signal light in the optical fiber amplifier 100, the light intensity adjusting devices 122 and 132 appropriately adjust the light intensities of pumping lights supplied to the amplifying optical fibers 111 and 112, whereby the wavelength dependency of gain in the optical fiber amplifier 100 attains a predetermined linear form.

Figure 4:
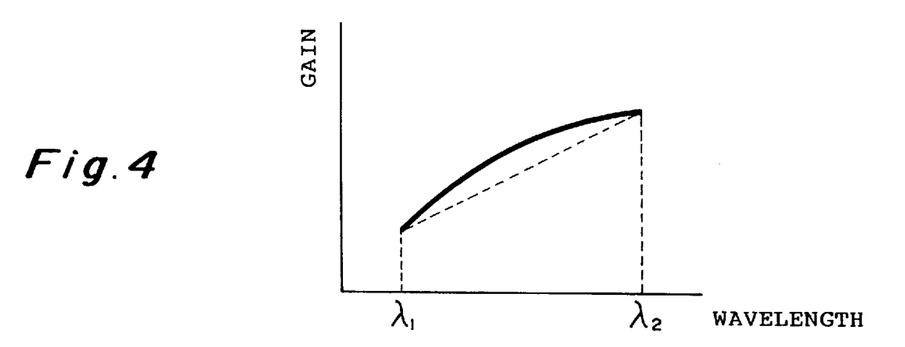
FIGS. 4 to 6 are charts showing an example of a set of gain characteristics for the amplifying optical fibers and optical fiber amplifier in the first embodiment shown in FIG. 3.
Figure 5:
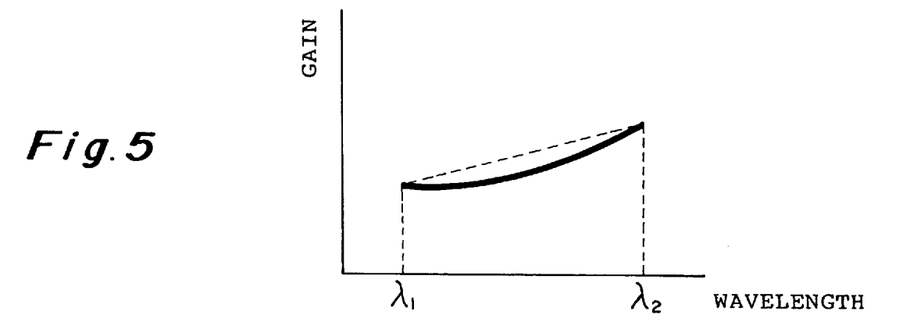
Figure 6:
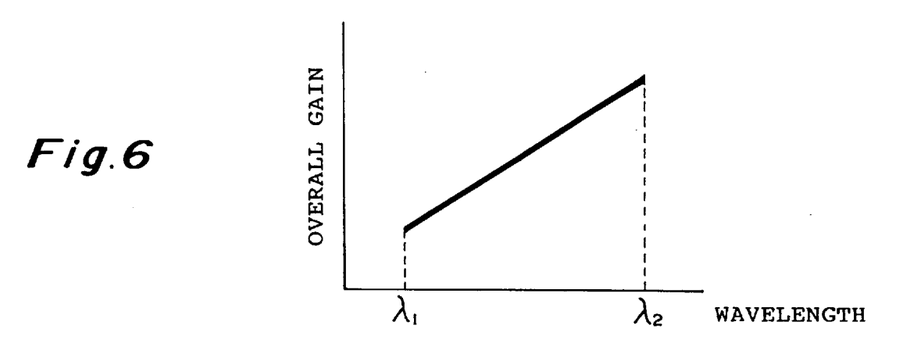

In the following, the respective gain characteristics of the amplifying optical fibers 111 and 112 as well as the gain characteristic of the optical fiber amplifier 100 will be explained in detail. FIGS. 4 to 6 are an example of a set of gain characteristic charts for the respective amplifying optical fibers and optical fiber amplifier in accordance with this embodiment.

As shown in FIG. 4, the amplifying optical fiber 111 has a gain characteristic such that the gain at a wavelength λ within the signal light wavelength range (between λ1 and λ2) is greater than the line (broken line in the chart) connecting the respective gains at wavelengths λ1 and λ2. This gain characteristic is similar to that inherent in typical amplifying optical fibers. As the amplifying optical fiber 111 having such a gain characteristic, an Er-doped optical fiber co-doped with Al element is used.

As shown in FIG. 5, the amplifying optical fiber 112 has a gain characteristic such that the gain at the wavelength λ is smaller than the line (broken line in the chart) connecting the respective gains at wavelengths λ1 and λ2. As the amplifying optical fiber 112 having such a gain characteristic, an Er-doped optical fiber co-doped with P element is used. This Er-doped optical fiber is further co-doped with Al element when necessary.

Also, the optical fiber amplifier 100 includes the fiber type couplers 123 and 133 as parts which influence the gain of signal light. Their signal light transmission characteristics are also expressed by equation (1).

Accordingly, the respective concentrations of elements with which the amplifying optical fibers 111 and 112 are co-doped are defined such that the overall gain of the optical fiber amplifier 100 obtained when the respective gains of all the parts on the transmission path of the signal light within the optical fiber amplifier 100, i.e., the gains of the amplifying optical fibers 111 and 112, fiber type couplers 123 and 133, and optical isolators 140 and 150, are combined together becomes linear or constant with respect to wavelength as shown in FIG. 6.

Figure 7:
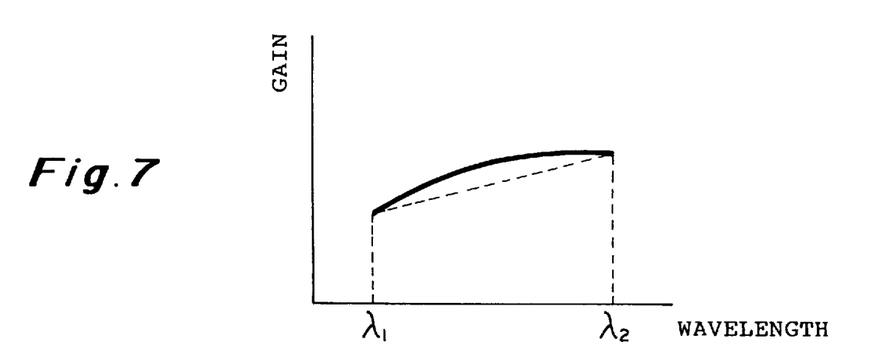
FIGS. 7 to 9 are charts showing an example of a set of gain characteristics for the amplifying optical fibers and optical fiber amplifier in the first embodiment shown in FIG. 3.
Figure 8:
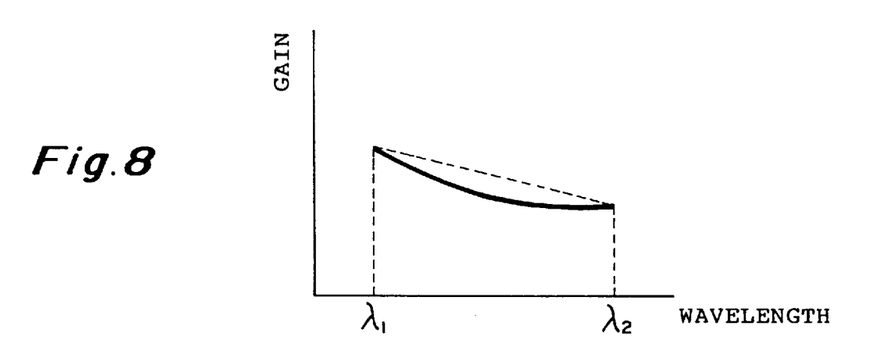
Figure 9:
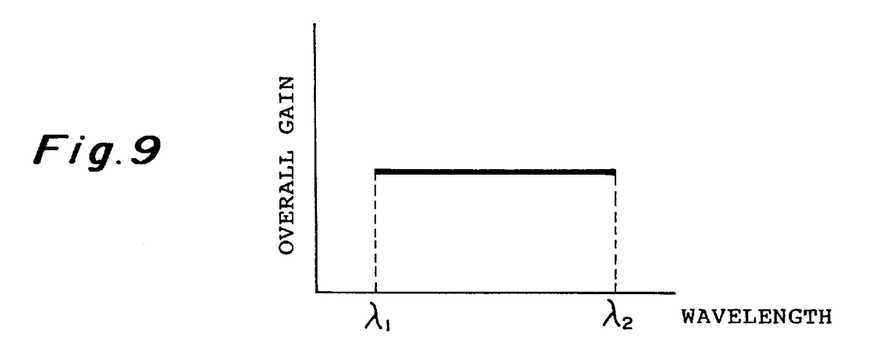

Further, the respective wavelength dependency characteristics of gain in the amplifying optical fibers 111 and 112, i.e., wavelength dependency of gain in the optical fiber amplifier 100, can be set to have a predetermined characteristic on the basis of not only the dopant element amount but also the respective lengths of the amplifying optical fibers 111 and 112 and the light intensities of pumping lights supplied thereto. FIGS. 7 to 9 show another example of a set of gain characteristic charts for the respective amplifying optical fibers and optical fiber amplifier in accordance with this embodiment.

In order to implement amplifying optical fibers having gain characteristics shown in these charts, the following procedures are taken, for example. As the amplifying optical fiber 111 is made shorter or the light intensity of pumping light supplied thereto is made greater, the gain characteristic of the amplifying optical fiber 111 (FIG. 7) can have a gradient lower than that of FIG. 4 while still yielding a higher gain with respect to signal light having a longer wavelength. On the other hand, as an appropriate amount of P element or Al element is added to the amplifying optical fiber 112, or its length or the light intensity of pumping light supplied thereto is adjusted to an appropriate level, the gain characteristic of the amplifying optical fiber 112 (FIG. 8) can be made such that, contrary to FIG. 5 where signal light with a longer wavelength has a higher gain, signal light having a longer wavelength has a lower gain. Accordingly, the gain characteristic of the optical fiber amplifier 100 has a lower gradient. When the respective lengths of the amplifying optical fibers 111 and 112 are further optimized and the light intensities of pumping lights supplied thereto are further appropriately adjusted, the overall gain of the optical fiber amplifier 100 can be made constant (FIG. 9).

Figure 10:
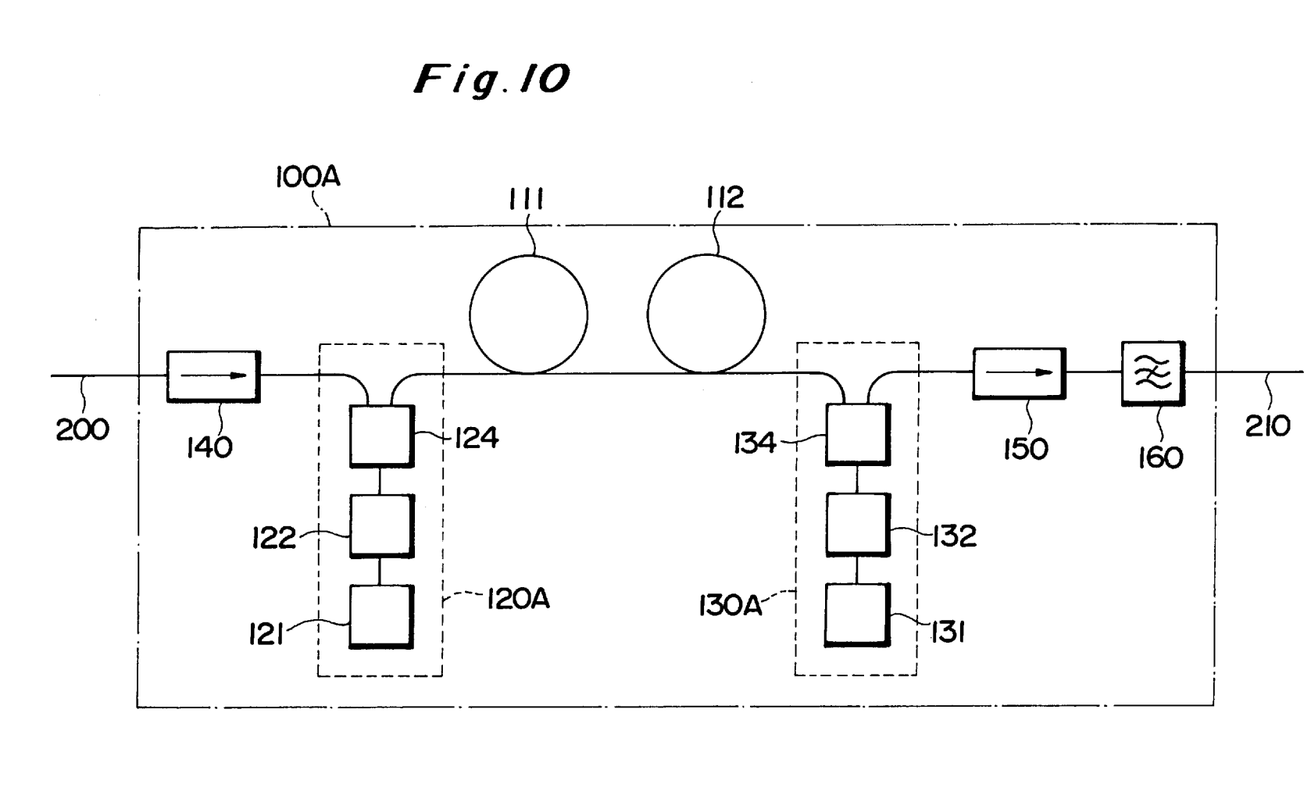
FIG. 10 is a configurational view of an optical fiber amplifier in accordance with a second embodiment of the present invention.

In the following, a second embodiment of the present invention will be explained. FIG. 10 is a configurational view of the optical fiber amplifier in accordance with this embodiment.

As in the case of the optical fiber amplifier 100 in accordance with the first embodiment, an optical fiber amplifier 100A in accordance with the second embodiment comprises the amplifying optical fibers 111 and 112 as well as the optical isolators 140 and 150. It differs from the optical fiber amplifier 100 in accordance with the first embodiment in that it comprises exciting devices 120A and 130A disposed in place of the exciting devices 120 and 130 with configurations different therefrom, as well as an ASE light eliminating filter 160 inserted between the optical isolator 150 and an output terminal of the optical fiber amplifier 100A.

The exciting devices 120A and 130A in this embodiment comprise filter type couplers 124 and 134 in place of the fiber type couplers 123 and 133 in the exciting devices 120 and 130 in the first embodiments, respectively. Pumping light output from the pumping light source 121 is appropriately adjusted in terms of light intensity by the light intensity adjusting device 122 and then, by way of the filter type coupler 124, guided to the amplifying optical fiber 111 and further to the amplifying optical fiber 112. On the other hand, pumping light output from the pumping light source 131 is appropriately adjusted in terms of light intensity by the light intensity adjusting device 132 and then, by way of the filter type coupler 134, guided to the amplifying optical fiber 112 and further to the amplifying optical fiber 111.

Each of the respective filter type couplers 124 and 134 in the exciting devices 120A and 130A has substantially a constant signal light transmission characteristic in the wavelength range of signal light in general. On the other hand, the ASE light eliminating filter 160 is disposed in order to cut off the ASE light having a predetermined wavelength. The wavelength of the ASE light is relatively close to the wavelength of signal light. For example, when the signal light resides in the band of 1.55 μm, the wavelength of the ASE light to be cut off is in the band of 1.53 μm. Accordingly, in general, the transmission characteristic of the ASE light eliminating filter 160 has a wavelength dependency with respect to signal light. Accordingly, adopted as the ASE light eliminating filter 160 is a filter having a transmission characteristic which can be substantially expressed by a second- or lower-order function of wavelength in the wavelength range of signal light. For example, a filter whose transmittance acutely changes between 0 and 1 near 1,540 nm may be used.

In this embodiment, the respective gain characteristics of the amplifying optical fibers 111 and 112 are determined by their concentrations of dopant elements, their lengths, and the light intensities of pumping light supplied thereto. Further, the wavelength dependency of gain in the optical fiber amplifier 100A is determined by the product of the respective gain characteristics of the amplifying optical fibers 111 and 112, respective signal light transmission characteristics of the filter type couplers 124 and 134, respective signal light transmission characteristics of the optical isolators 140 and 150, and signal light transmission characteristic of the ASE light eliminating filter 160. Also, the wavelength dependency of gain in the optical fiber amplifier 100A is made linear or constant. Here, the light intensity adjusting devices 122 and 132 adjust the pumping lights supplied to the amplifying optical fibers 111 and 112, such that the wavelength dependency of gain in the optical fiber amplifier 100A attains a predetermined linear relationship.

The optical fiber amplifier 100A operates as explained in the following. The multiwavelength signal light which has reached the optical fiber amplifier 100A after being transmitted through the transmission optical fiber 200 passes through the optical isolator 140 and the filter type coupler 124 so as to be transmitted through the amplifying optical fiber 111 and then through the amplifying optical fiber 112. Here, when the pumping light is supplied to the amplifying optical fibers 111 and 112 from the exciting devices 120 and 130, a plurality of wavelengths of the signal light are collectively amplified while being transmitted through the amplifying optical fibers 111 and 112. Thus amplified signal light passes through the filter type coupler 134 and the optical isolator 150 so as to be output from the optical fiber amplifier 100A and sent to the transmission optical fiber 210. Upon amplification of signal light in the optical fiber amplifier 100A, the light intensity adjusting devices 122 and 132 appropriately adjust the light intensity of pumping lights supplied to the amplifying optical fibers 111 and 112, whereby the wavelength dependency of gain in the optical fiber amplifier 100A attains a predetermined linear form.

In the following, results of experiments will be explained. Here, gain characteristics and noise factors of optical fiber amplifiers were measured in three cases. Table 1 is a chart summarizing the conditions and results of the experiments, whereas Table 2 is a chart summarizing the compositions of dopant elements in Er-doped optical fibers used in the experiments.

TABLE 1

|  | Case 1 | Case 2 | Case 3 |
|---|---|---|---|
| Total extension length of optical fiber (km) | 1000 | 1000 | 1000 |
| Number of relays | 28 | 28 | 20 |
| Configuration of optical amplifier | FIG. 10 | FIG. 10 | FIG. 3 |
| Species EDF (length (m)) | EDF-A (6.4) | EDF-A (6.6) | EDF-A (9.4) |
|  | EDF-B (1.1) | EDF-C (0.8) | EDF-C (4.4) |
| Gain deviation (dB) | 2.69 | 1.12 | 0.98 |
| Max NF (dB) | 19.3 | 19.1 | 17.8 |

TABLE 2

|  | EDF-A | EDF-B | FDF-C |
|---|---|---|---|
| Er Concentration (wt ppm) | 1000 | 1000 | 1000 |
| Al Concentration (wt %) | 1.4 | 2.0 | 0.8 |
| P Concentration (wt %) | 0 | 5.0 | 5.0 |

Conditions common in all the cases are as follows: The signal light used here comprises eight waves respectively having wavelengths of 1,545.5 nm, 1547.0 nm, 1548.5 nm, 1,550.0 nm, 1,551.5 nm, 1,553.0 nm, 1,554.5 nm, and 1,556.0 nm; while they have the same intensity at the time of input. While one of the optical fiber amplifier 100A shown in FIG. 10 and the optical fiber amplifier 100 shown in FIG. 3 is used in the individual cases, each of the isolators 140 and 150 has an insertion loss of 2 dB, each of the fiber type couplers 123 and 133 and the filter type couplers 124 and 134 also has an insertion loss of 2 dB, and the pumping light has a wavelength of 1,480 nm and an intensity of 10 mW. The transmission optical fiber has a total extension length of 1,000 km, whereas its average loss in signal light intensity is 0.28 dB/km.

The types of optical fiber amplifiers used and the number of relays therein are as follows: In cases 1 and 2, 28 relays of the optical fiber amplifiers 100A shown in FIG. 10 are used; whereas 20 relays of the optical fiber amplifiers 100 shown in FIG. 3 are used in case 3. The signal light transmission characteristic of the ASE light eliminating filter 160 inserted into the optical fiber amplifier 100A shown in FIG. 10 has an attenuation of 3 dB within the wavelength range from 1,520 nm to 1,538 nm. Each of the fiber type couplers 123 and 133 used in the optical fiber amplifier 100 shown in FIG. 3 has a signal light transmission characteristic represented by the above-mentioned expression (1), in which $\lambda_s$=1,550 nm and $\lambda_p$=1,480 nm.

As the amplifying optical fibers used in these cases, three kinds of Er-doped optical fibers were used in their appropriate lengths. These three kinds of Er-doped optical fibers are respectively referred to as EDF-A, EDF-B, and EDF-C, each having an Er element dopant amount of 1,000 wt·ppm. EDF-A has an Al element dopant amount of 1.4 wt % and a P element dopant amount of 0 wt %; EDF-B has an Al element dopant amount of 2.0 wt % and a P element dopant amount of 5.0 wt %; and EDF-C has an Al element dopant amount of 0.8 wt % and a P element dopant amount of 5.0 wt %. According to these compositions, EDF-A has a wavelength dependency of gain in an upward protruded form, while yielding a larger gain as the wavelength is longer; EDF-B has a wavelength dependency of gain in an upward protruded form, while yielding a smaller gain as the wavelength is longer; and EDF-C has a wavelength dependency of gain in a downward protruded form, while having a smaller gain as the wavelength is longer.

Figure 11:
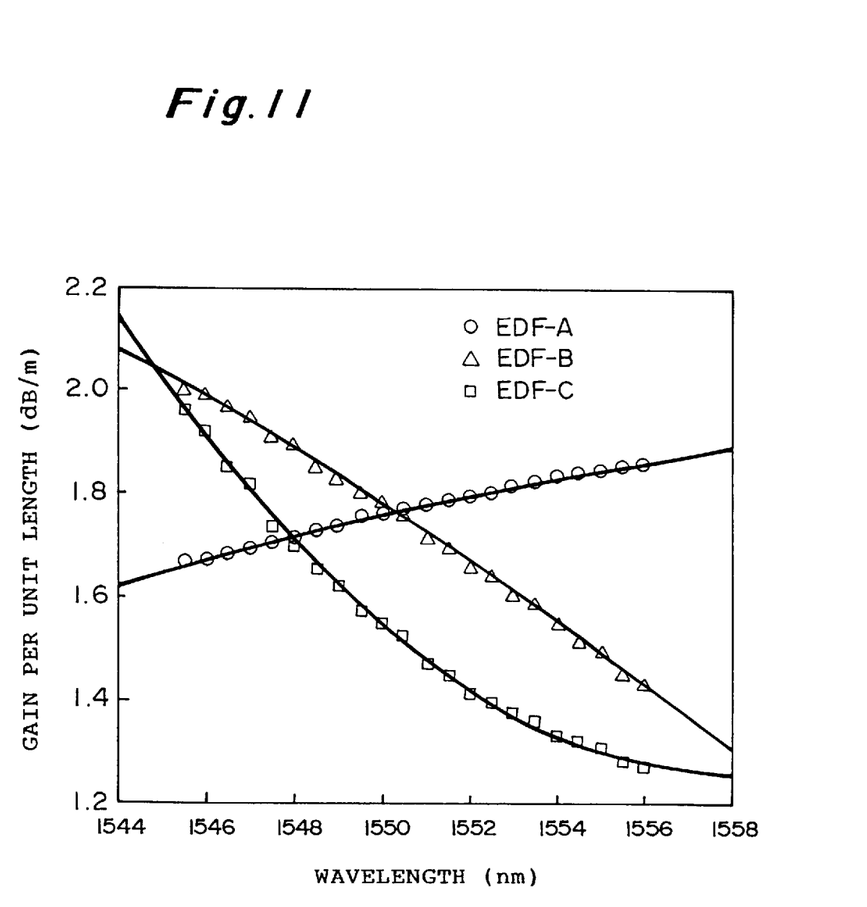
FIG. 11 is a graph showing the wavelength dependency characteristics of gain in the amplifying optical fibers shown in Tables 1 and 2.

FIG. 11 is a graph showing wavelength dependency characteristics of gain in EDF-A, EDF-B, and EDF-C per unit length in the wavelength range of signal light under the operational conditions of cases 1 to 3. The second-order regression curve of $\lambda$ representing gain G (unit: dB/m) per unit length and correlation ratio r of the gain to the regression curve in the three kinds of EDFs are as follows:

In EDF-A, the regression curve and the correlation ratio r are:

$$G = -1.3216 \times 10^{-22} + 1.6881 \times 10^{-25}\lambda - 5.3826 \times 10^{-29}\lambda^2$$

r=0.997

In EDF-B, the regression curve and the correlation ratio r are:

$$G = -1.7550 \times 10^{-22} + 2.3213 \times 10^{-25}\lambda - 7.6635 \times 10^{-29}\lambda^2$$

r=0.999

In EDF-C, the regression curve and the correlation ratio r are:

$$G = 1.0891 \times 10^{-21} - 1.3979 \times 10^{-24}\lambda + 4.8862 \times 10^{-28}\lambda^2$$

r=0.998

Thus, while the correlation ratio r in each EDF exceeds 0.99, the coefficient of the second-order term for wavelength $\lambda$ is negative in EDF-A and EDF-B and positive in EDF-C.

Also, cascaded to each other are 6.4 m of EDF-A and 1.1 m of EDF-B in case 1, 6.6 m of EDF-A and 0.8 m of EDF-C in case 2, and 9.4 m of EDF-A and 4.4 m of EDF-C. Namely, case 1 comprises a combination of conventional amplifying optical fibers, whereas each of cases 2 and 3 comprises a combination of amplifying optical fibers in accordance with the present invention.

To one end of each of the optical communication systems in the three cases mentioned above, eight waves of signal light with the same intensity were input, and the intensity spectrum of the signal light output to the other end was measured so as to determine the gain characteristic and noise factor characteristic of the optical communication system as a whole.

Figure 12:
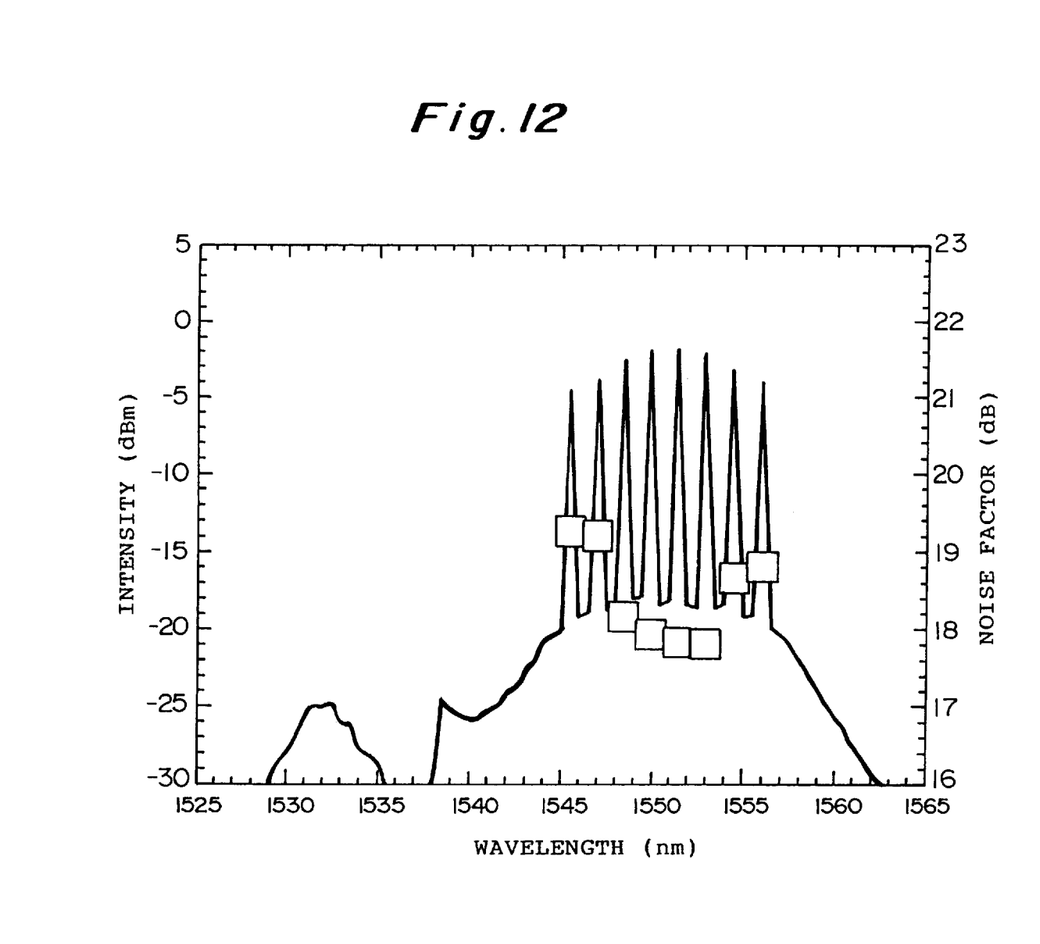
FIG. 12 is a graph showing results of an experiment concerning characteristics of the optical fiber amplifier in accordance with the present invention (case 1)
Figure 13:
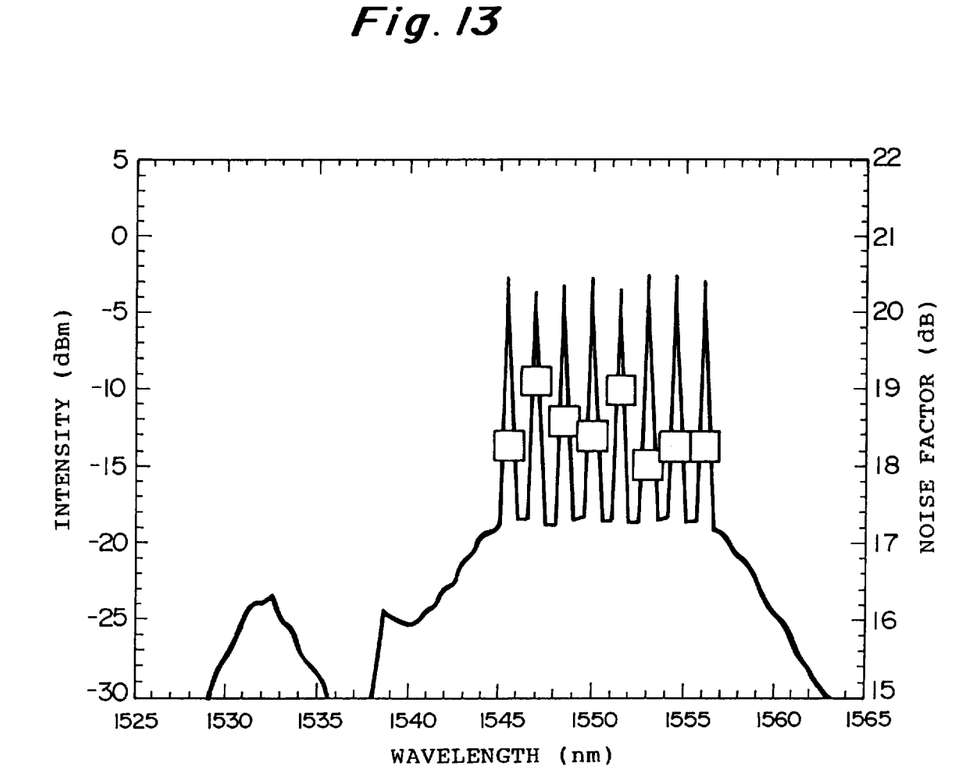
FIG. 13 is a graph showing results of an experiment concerning characteristics of the optical fiber amplifier in accordance with the present invention (case 2)
Figure 14:
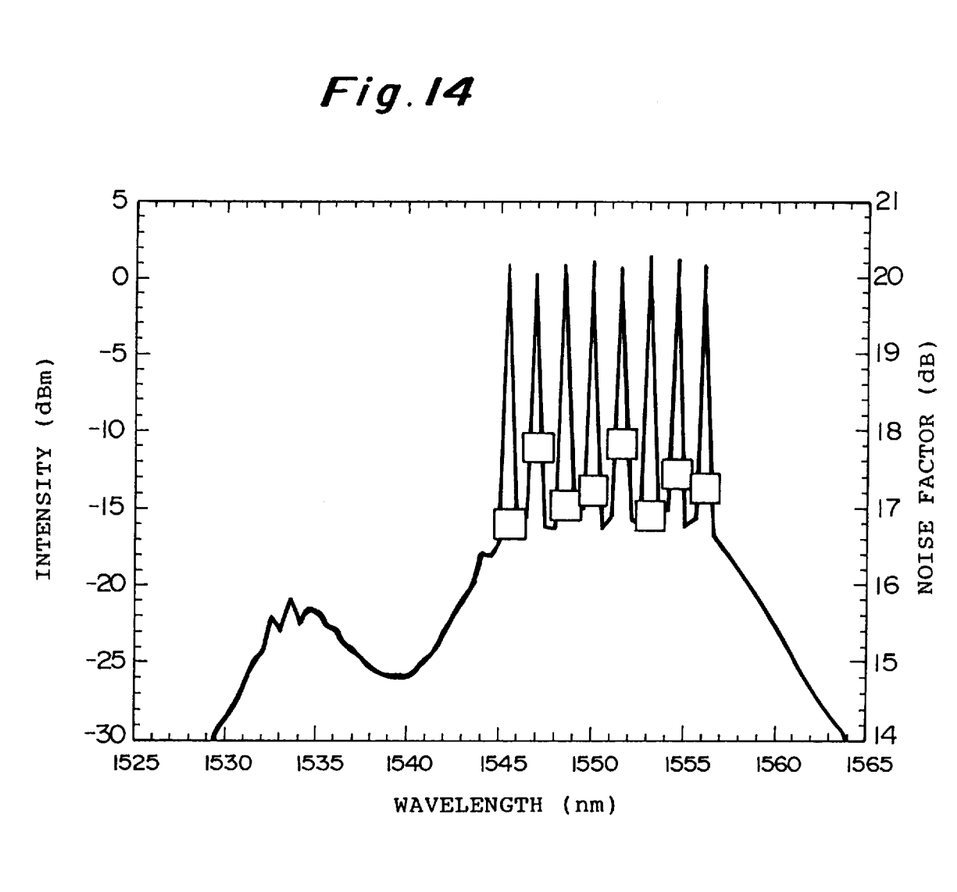
FIG. 14 is a graph showing results of an experiment concerning characteristics of the optical fiber amplifier in accordance with the present invention (case 3).

FIGS. 12 to 14 show thus obtained intensity spectra and noise factor characteristics of cases 1 to 3, respectively. Here, continuous curves indicate intensity spectra, while square marks indicate noise factors.

The gain deviation (difference between the maximum and minimum values in the respective gains for eight waves of signal light) and the maximum noise factor (maximum value in the noise factors at the respective wavelengths of eight waves) for each case determined from these charts are summarized in Table 1. The gain deviation and the maximum noise factor were respectively 2.69 dB and 19.3 dB in case 1; 1.12 dB and 19.1 dB in case 2; and 0.98 dB and 17.8 dB in case 3.

From these results, the following facts are seen. In case 1, since the amplifying optical fiber EDF-A and EDF-B each having a wavelength dependency of gain in an upward protruded form are cascaded to each other, the intensity spectrum of output signal light exhibits the maximum gain near the center of the signal wavelength range, i.e., at wavelengths of 1,550.5 nm and 1,551.5 nm, while exhibiting the minimum gain at the wavelength of 1,545.5 nm positioned at one end of the signal light wavelength range, thereby yielding a gain deviation of 2.69 dB which is larger than that of the other cases. By contrast, in cases 2 and 3, since the amplifying optical fibers EDF-A and EDF-C whose wavelength dependency characteristics of gain have oppositely protruded forms are cascaded to each other, their gain characteristics are offset against each other, thereby yielding an intensity spectrum of output signal light flatter than that resulting from case 1. Their gain deviations are respectively 1.12 dB and 0.98 dB, each of which is about ½ or less of the result obtained by case 1.

Also, in case 3, in place of the filter type coupler having a flat signal light transmission characteristic used in case 2, a fiber type coupler having a signal light transmission characteristic represented by expression (1) is used. Notwithstanding this fact, the gain deviation in case 3 is smaller than that in case 2. The reason for this phenomenon can be explained as follows. In case 3, in order to compensate for the upward protruded signal light transmission characteristic inherent in the fiber type coupler, EDF-C is made longer than that in case 2 so as to attain a further downward protruded gain characteristic, thereby securing a linear characteristic in the wavelength dependency of gain in the optical fiber amplifier. When EDF-C is elongated alone, the optical fiber amplifier has a smaller gain as the wavelength is longer. Accordingly, EDF-A is also elongated, thereby making the gain in EDF-A increase in a greater amount as the wavelength is longer. Thus, when each of EDF-A and EDF-C is appropriately elongated, the gain deviation can be made small, while the wavelength dependency of gain is substantially made flat. Here, as each of the amplifying optical fibers is elongated, the optical fiber amplifier has a greater gain. In response thereto, loss in relaying span, which is 10 dB in cases 1 and 2, is changed to 14 dB. Accordingly, the number of relaying operations, which is 28 in each of cases 1 and 2, is reduced to 20 in case 3.

Without being restricted to the foregoing embodiments, the present invention can be modified in various manners. For example, only one exciting device may be provided for effecting any of forward and backward excitation techniques. Not only the two kinds of amplifying optical fibers but also three or more kinds of amplifying optical fibers may be cascaded to each other.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 231363 filed on Sep. 8, 1995 is hereby incorporated by reference.

What is claimed is:

1. An optical fiber amplifier which receives signal light having a wavelength included in a wavelength range from a first wavelength as a lower limit wavelength to a second wavelength as an upper limit wavelength, amplifies said signal light, and then outputs thus amplified signal light, said optical fiber comprising:

an pumping means for generating pumping light;

a first amplifying optical fiber which, in a state where the pumping light output from said pumping means is input therein, receives light in the wavelength range, amplifies thus received light, and then outputs thus amplified light, said first amplifying optical fiber having a wavelength dependency of gain in said wavelength range with a correlation ratio of not smaller than 0.99 with respect to a first second-order regression curve expressed by a first second-order function in which wavelength is an independent variable and a coefficient of square term of the wavelength is a negative value; and a second amplifying optical fiber which is optically cascaded to said first amplifying optical fiber and, in a state where the pumping light output from said pumping means is input therein, receives light in said wavelength range, amplifies thus received light, and then outputs thus amplified light, said second amplifying optical fiber having a wavelength dependency of gain in said wavelength range with a correlation ratio of not smaller than 0.99 with respect to a second second-order regress curve expressed by a second second-order function in which wavelength is an independent variable and a coefficient of square term of the wavelength is a positive value.

2. An optical fiber amplifier according to claim 1, wherein said fourth function is substantially a constant value in said wavelength range regardless of change in the wavelength.

3. An optical fiber amplifier according to claim 1, wherein said fourth function is a first first-order function in which a coefficient of wavelength is a first value, further comprising a filter through which the signal light passes, said filter having a wavelength dependency of a transmission characteristic substantially expressed by a second first-order function in which a coefficient of wavelength is a second value, said second value having a sign opposite to the sign of said first value and an absolute value identical to the absolute value of said first value.

4. An optical fiber amplifier according to claim 1, wherein length of said first amplifying optical fiber, length of said second amplifying optical fiber, and respective light intensities of the pumping light supplied to said first and second amplifying optical fibers are determined according to respective wavelength dependency characteristics of amplification factors of said first and second amplifying optical fibers per unit length and said third function, and wherein said pumping means comprises a light intensity adjusting means for adjusting the respective light intensities of the pumping light supplied to said first and second amplifying optical fibers.

5. An optical fiber amplifier according to claim 1, wherein said pumping means comprises a first fiber type coupler which receives the pumping light from a first terminal and outputs received pumping light from a second terminal toward said first amplifying optical fiber, while transmitting the signal light therethrough between said second terminal and a third terminal.

6. An optical fiber amplifier according to claim 1, wherein said pumping means comprises a second fiber type coupler which receives the pumping light from a first terminal and outputs received pumping light from a second terminal toward said second amplifying optical fiber, while transmitting the signal light therethrough between said second terminal and a third terminal.

7. An optical fiber amplifier according to claim 1, wherein said first amplifying optical fiber is an Er-doped optical fiber co-doped with Al, while said second amplifying optical fiber is an Er-doped optical fiber co-doped with P.

8. An optical fiber amplifier according to claim 7, wherein said second amplifying optical fiber is an Er-doped optical fiber further co-doped with Al.

9. An optical fiber amplifier according to claim 8, wherein Al concentration in said second amplifying optical fiber is 1 wt % or lower.

10. An optical fiber amplifier according to claim 1, wherein an overall transmission characteristic of a plurality of optical parts, except for said first amplifying optical fiber and said second amplifying optical fiber, through which the signal light passes is substantially expressed by a third function which is of second order or lower, wherein a fourth function which is a sum of said first and second second-order functions and said third function is substantially a linear function.

11. An optical fiber amplifier which receives signal light having a wavelength in a wavelength range having a first wavelength as a lower limit and a second wavelength as an upper limit, amplifies said signal light, and then outputs thus amplified signal light, said optical fiber comprising:

a pumping means for generating pumping light;

a first amplifying optical fiber which, in a state where the pumping light output from said pumping means is input therein, receives light in the wavelength range, amplifies thus received light, and then outputs thus amplified light, said first amplifying optical fiber having a gain that is greater than the value obtained by linear interpolation calculation from the gains at said first and second wavelengths; and a second amplifying optical fiber which is optically cascaded to said first amplifying optical fiber and, in a state where the pumping light output from said pumping means is input therein, receives light in said wavelength range, amplifies thus received light, and then outputs thus amplified light, said second amplifying optical fiber having a gain that is smaller than the value obtained by linear interpolation calculation from the gains at said first and second wavelengths, in said wavelength range.

12. An optical fiber amplifier according to claim 11, wherein the overall gain of said optical fiber amplifier within said wavelength range is substantially linear.

* * * * *